Jan. 21, 1941.  E. MEILI  2,229,251
TRACTION DEVICE FOR WHEELS PROVIDED WITH RUBBER TIRES
Filed March 22, 1938
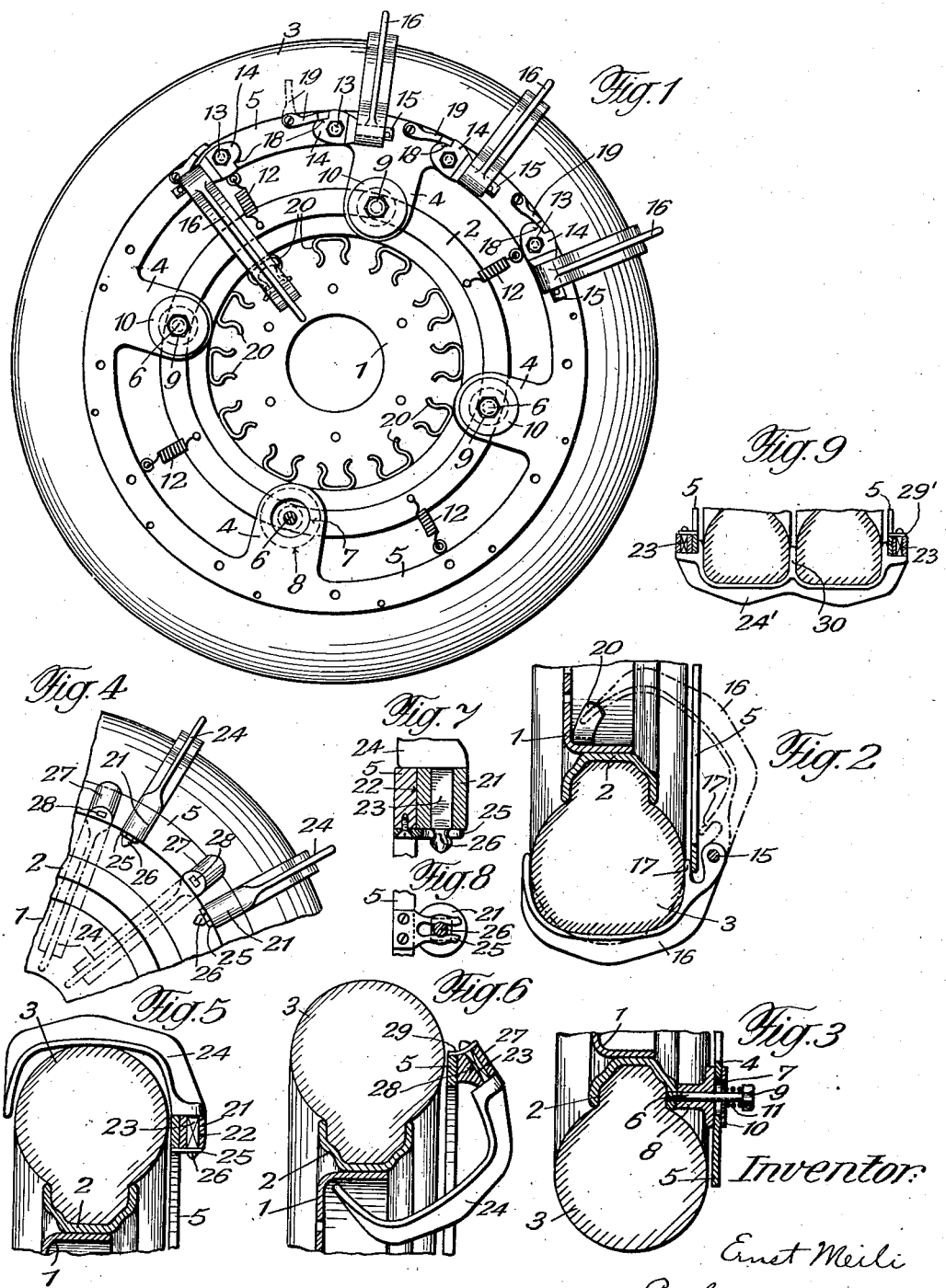
Inventor:
Ernst Meili
By Sommers & Young
Attys.

Patented Jan. 21, 1941

2,229,251

UNITED STATES PATENT OFFICE 2,229,251

TRACTION DEVICE FOR WHEELS PROVIDED WITH RUBBER TIRES

Ernst Meili, Schaffhausen, Switzerland, assignor to A. H. Marx, Zollikerberg, (Zurich), Switzerland Application March 22, 1938, Serial No. 197,477
In Switzerland March 27, 1937

6 Claims. (Cl. 152—216)

This invention relates to traction devices for wheels provided with rubber tires.

Such traction devices must resist the considerable strains resulting from the running resistance as well as impacts arising from inequalities of the ground without damage to their joints or to the rubber tires. Furthermore, these devices must be so designed that they can be readily moved from the operative into an inoperative position and vice versa, in a convenient manner, so as to allow of alternately driving on soft ground and on hard road surfaces without causing much loss of time.

Several constructions of traction devices of this kind have already been proposed. There are known traction devices which are rockable round axes extending in the plane of the wheel as well as at right angles thereto, the gripping members proper of the device resting against the tire being connected with their pivot joints by a relatively long oblique arm, in order to prevent impacts acting in the radial direction from being transmitted to their pivot joints directly, as this is the case for gripping members lying with the pivot joints thereof in a common radial plane. The long arms required are cumbersome when being rocked into inoperative position, particularly if wheels of relatively small diameters are involved. For eliminating this drawback, it has already been proposed to space the pivot joints for rocking the arms in the plane of the wheels and those for rocking the arms at right angles to this plane at a distance apart. The known traction devices described have, however, the drawback that the thrusts and impacts acting in directions parallel with the wheel plane and transversely of the same are transmitted to the pivot joints, thus inviting damage to these joints as well as to the tires.

The object of the present invention is to eliminate this drawback.

According to the invention means are provided in the traction device for protecting the joints of the gripping members from the influence of unduly large impacts setting up in the running wheel, particularly in the direction transversely of the wheel plane.

For this purpose the gripping members may be provided on the side thereof adjacent to the joint with a flap-like projection which in the position of use of these members grips behind a supporting member on which the joints of the gripping members are arranged, so that the surface on the gripping members for encompassing the rubber tire is enlarged and the transverse forces acting on the gripping members are transmitted to the supporting member directly.

In this arrangement the supporting member for the joints may be shiftable relative to the body of the wheel as a self-contained unit and be adapted to yield on unduly large impacts arising, in order to avoid undue straining of the joints.

The portion of the gripping member encompassing the tire may, advantageously, be given a shape similar to that of a stirrup which faces the tire with its open side and the legs of which, inclusive of the flap-shaped projections, extend approximately up to the largest diameter of the rubber tire, so that the loaded tire is expanded into the gripping member in the position of use of the latter and retains the tire in position by effect of the lateral pressure exerted by the compressed tire.

In the accompanying drawing two constructional forms of the invention are illustrated by way of example only, in which Fig. 1 shows an end elevation of a wheel provided with a first form of the traction device according to the invention;

Fig. 2 is a radial section of the peripheral portion of the wheel shown in Fig. 1;

Fig. 3 is a similar radial section of the wheel shown in Fig. 1;

Fig. 4 is a partial view of a wheel provided with a second constructional form of the traction device according to the invention;

Fig. 5 is a radial section of the wheel shown in Fig. 4 with gripping members of the device in position of use;

Fig. 6 is a corresponding radial section with a gripping member in inoperative position;

Fig. 7 is a partial section of Fig. 5;

Fig. 8 is a bottom view of Fig. 7;

Fig. 9 is a radial section of a twin wheel with a modified gripping member.

In the constructional form of the traction device shown in Figs. 1 to 3, the numeral 1 designates an embossed wheel disk, 2 referring to the wheel rim and 3 to the rubber tire. On the wheel rim 2, four lugs 4 of a supporting ring 5 are secured by means of retaining bolts 6 screwed in the wheel rim. The bores 7 of the lugs 4 are of substantially larger diameter than the bolts 6, so that the ring 5 is mounted on these bolts with play and is thus adapted to yield to a limited extent, but is moved along by the bolts 6, when the wheel rotates.

Between the four lugs 4 and the wheel rim 2 spacing sleeves 8 are arranged on the bolts 6 for the lugs 4 to bear against. Further, between the head 9 of each bolt 6 and a washer 10 surrounding the bolt shank, a spring 11 is inserted which springs urge the lugs 4 resiliently against the spacing sleeves 8, in consequence of which the supporting ring is adapted to yield to the influence of lateral pressure. At each of four points uniformly distributed over the circumference of the wheel, a tension spring 12 is inserted between the wheel rim 2 and the supporting ring 5, these springs serving the purpose of readjusting the ring 5 into concentric relation to the wheel after each radial displacing movement of the ring.

In the mounting ring 5, bearing bolts 13 are screwed on each of which a mounting arm 14 is mounted for rocking movement about the axis of the bolt, the axes of these bolts extending parallel to the wheel axle. On the mounting arm 14 a pin 15 is formed on which one end of a gripping member 16 is rockably mounted. This mounting end of the gripping member 16 is provided with a projection 17 which grips behind the supporting ring 5, when the gripping member 16 assumes its position of use, and functions to transmit the shearing forces acting on the gripping member and the compression forces acting transversely of the plane of the wheel directly to the supporting annulus, so that these forces are not transmitted to the tire and the pivot joint is relieved also. Furthermore, the projection 17 provides an enlargement of the surface of the gripping members which encompasses the tire. The portion of the gripping member encompassing the tire is given a shape similar to that of a stirrup the open side of which faces the tire and the legs of which, inclusive of the flap-shaped projection, extend approximately up to the largest diameter of the rubber tire, so that the loaded tire is expanded into the gripping member and retains the tire in position by effect of lateral pressure resulting from the tire being compressed by the ground.

On a hub-shaped portion of the mounting arm 14 a shoulder 18 is formed which cooperates with a pawl 19 carried by the supporting ring 5, so that the pawl, when engaging with the shoulder, limits the rocking movement of the mounting arm 14 in one direction of rotation, in which way, the gripping members are secured in position of use while the wheel rotates in the direction for backward driving. Furthermore, the projection 17 gripping behind the supporting ring 5, in the position of use of the gripping member 16, prevents the latter from rocking away from the tire about the pin 15.

With a view of retracting the gripping member 16 from position of use into an inner position on the wheel, the pawl 19 is moved out of engagement with the shoulder 18. Thereupon the mounting arm 14 and the gripping member 16 are conjointly rocked round the bearing bolt 13 in the counter-clockwise direction, until the projection 17 is moved clear of the supporting ring 5, whereupon the gripping member 16 is rocked about the pin 15. In this intermediate position of rocking away from the tire, the gripping member 16 is rocked clockwise together with the mounting arm 14 about the bolt 13 through approximately 180°, whereupon the gripping member 16 can be further swung about the pin 15 into its inner end position on the wheel in which it is unobstructive.

Pairs of oppositely disposed spring jacks 20 are arranged radially inwardly on the wheel disk 1, for locking the outer ends of the individual gripper members 16 by interengagement with the jacks of the associated pair in the inoperative inner end position of these members on the wheel.

In order to move the gripping members into position of use again, the sequence of rocking movements described immediately above is reversed for each individual member.

It will be observed that the gripping members 16 are so connected with the supporting ring 5 in their position of use, especially by means of the projection 17, that the loads to which the gripping members are subjected during the operation can act on the bearing pins and bolts only to a negligible extent, so that these parts are only slightly worn. The projections 17 limit the range of movement of the gripping members and thus protect the rubber from being damaged by these members. Due to the supporting ring 5 being resiliently mounted, bearing engagement between the gripping members and the rubber tire is ensured even in the worn condition of the latter. Experience has shown that by this means the operation and the efficiency of the gripping members is greatly improved. Moreover, the gripping members do not interfere with the tire adapting itself to various surface configurations of the ground.

In the second constructional form of the traction device shown in Figs. 4 to 8, the supporting ring 5 is resiliently mounted on the wheel in a manner similar to that described for the first constructional form. Lateral projections 21 of the supporting ring 5 are each provided with a bore 22 of square cross section into which a corresponding square stud 23 provided on one end of the gripping member 24 can be inserted. A forked leaf spring 25 screwed on the ring 5 engages into a groove 26 of the stud 23 in the inserted position of the gripping member 24, in which way, the gripping member is locked in position. With this construction provision is made for removing the gripping members from the wheel, when they are not used, in a simple manner, by retracting the studs 23 from the bores 22. These gripping members can thus be used in connection with wheels also the body of which is not sufficiently hollowed for accommodating the gripping members in an inner unobstructed position on the wheel. Provided that the necessary space is available, further projections 27 with square bores 28 may be provided on the supporting ring 5, in such manner, that the gripping members can be locked to the wheel, when not in use, in a position as shown in Fig. 6, by inserting the studs 23 into the bores 28. Also in this position each gripping member is securely retained by a spring 29 interengaging with a groove 26 in the stud 23.

Due to the supporting ring 5 being resiliently mounted, the gripping members 24 also bear against the rubber tire at all times, when loaded.

In both constructional forms described, the supporting ring 5 is adapted to yield not only in a plane parallel to the plane of the wheel, but also in the axial direction against the action of springs 11, for example, if lateral pressure is exerted on the gripping member by effect of the loading of the tire. Alternatively, for maintaining the bearing engagement between the supporting ring 5 and the wheel, spring washers may be used instead of the springs 11.

Furthermore, in the second constructional form of the traction device, terminal studs on the gripping members of round instead of square cross section and bores mating the same may be used. Moreover, instead of providing the gripping members with studs for insertion in mating bores only at one end of these members, such studs may be provided at both ends of the members. In connection therewith a second resilient supporting ring is arranged at the opposite end of the wheel. Such a construction is applicable with advantage to twin wheels, in which case gripping members 24' are used which are prolonged so as to extend across both tires (Fig. 9). Gripping members of this kind may be provided on the underside with a central rib 30 for engagement in between the two tires in the position of use of the gripping members 24' on the wheel. Furthermore, the gripping members 24' may be provided at both ends with a terminal stud 23, supporting members 5 being arranged at both ends of the wheel and provided with bores mating the studs, for retaining the gripping members 24' in position of use due to the studs being locked to the bores by forked leaf springs 29'.

Again, the gripping members may be arranged so as to extend, in their position of use, across the tire in an inclined direction to the wheel axle.

Various changes and modfications may be made in the practice of my invention without departing from the principle or spirit thereof, by adding customary practice and established knowledge of the art to the present disclosure, and the scope of the appended claims is not to be regarded as limited except as specified therein.

I claim:

1. In a traction device for wheels provided with rubber tires, a gripper support, gripping members pivotally mounted on said support for encompassing the tire in the position of use of said members, means for directly connecting the support to a wheel for universal movement with respect to said wheel, a flap-shaped projection provided on said gripping members adjacent the pivot joint thereof enlarging the gripping member surface encompassing said tire and bearing against said support, in the position of use of said gripping members, thereby directly transmitting the forces acting on said gripping members in the transverse direction thereof to said support, when the wheel is running.

2. In a traction device for wheels provided with rubber tires, a wheel body provided with a hub, pivotal gripping members joined to the wheel for encompassing the tire in the position of use of said members, a supporting member connected with said gripping members by the pivot joints of the latter, and shiftable relative to said wheel body for yielding to unduly large impacts setting up during the run, thereby preventing undue straining of said pivot joints, bearing bolts fixed to said supporting member in parallelism with the axis of said wheel, a mounting arm for each of said gripping members rockably arranged on each of said bolts for enabling said gripping members to be fitted to said tire, a shoulder on each mounting arm, and pawls engageable with the respective shoulders for securing said gripping members fitted to said tire against unintentional rocking movements and, when disengaged, allowing said members to be rocked from their position of use inwardly on the wheel towards said hub.

3. In a traction device for wheels provided with rubber tires, a wheel body, pivotal gripping members joined to the wheel for encompassing the tire in the position of use of said members, an annular supporting member connected with said gripping members by the pivot joints for the latter, retaining bolts provided on the wheel for receiving said supporting member with play, said supportng member being resiliently urged against said wheel and being shiftable relative to said wheel body for yielding to unduly large impacts setting up during the run, thereby preventing undue straining of said pivot joints.

4. In a traction device for wheels provided with rubber tires, a wheel body, pivotal gripping members joined to the wheel for encompassing the tire in the position of use of said members, an annular supporting member connected with said gripping members by the pivot joints for the latter, retaining bolts provided on the wheel for receiving said supporting member with play, and spring means inserted between said supporting member and rigid portions on said wheel for resiliently urging said supporting member against said rigid portions, said supporting member being shiftable relative to said wheel body for yielding to impacts setting up during the run in directions transversely of the wheel, thereby preventing undue straining of said pivot joints.

5. In a traction device for wheels provided with rubber tires, a wheel body, pivotal gripping members joined to the wheel for encompassing the tire in the position of use of said members, an annular supporting member connected with said gripping members by the pivot joints for the latter, tension springs intercalated between said supporting member and the wheel in a circumferentially uniform distribution for centering said supporting member relative to the axis of said wheel, and retaining bolts provided on the wheel for receiving said supporting member with play, said supporting member being resiliently urged against said wheel and being shiftable relative to said wheel body for yielding to unduly large impacts setting up during the run, thereby preventing undue straining of said pivot joints.

6. In a traction device for wheels provided with rubber tires, a wheel body provided with a hub, pivotal gripping members joined to the wheel for encompassing the tire in the position of use of said members, spring jacks arranged radially inwardly on the wheel for engaging with said gripping members, a supporting member connected with said gripping members by the pivot joints of the latter and shiftable relative to said wheel body for yielding to unduly large impacts setting up during the run, thereby preventing undue straining of said pivot joints, bearing bolts fixed to said supporting member in parallelism with the axis of said wheel, a mounting arm for each of said gripping members rockably arranged on each of said bolts for enabling said gripping members to be fitted to said tire, a shoulder on each mounting arm, and pawls engageable with the respective shoulders for securing said gripping members fitted to said tire against unintentional rocking movements and, when disengaged, allowing said members to be rocked from their position of use inwardly on the wheel towards said hub into engagement with said spring jacks.

ERNST MEILI.